Patented June 7, 1932

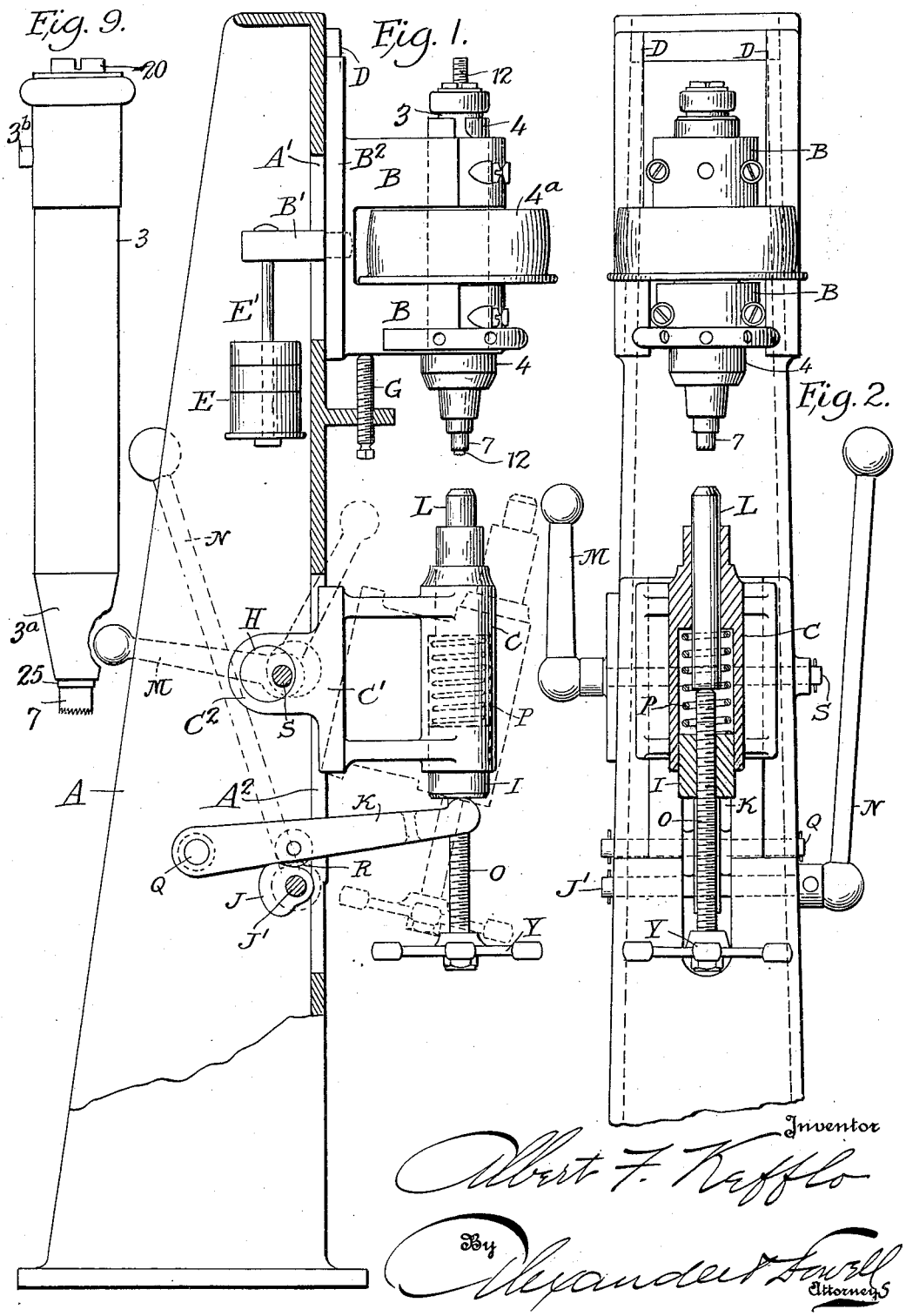

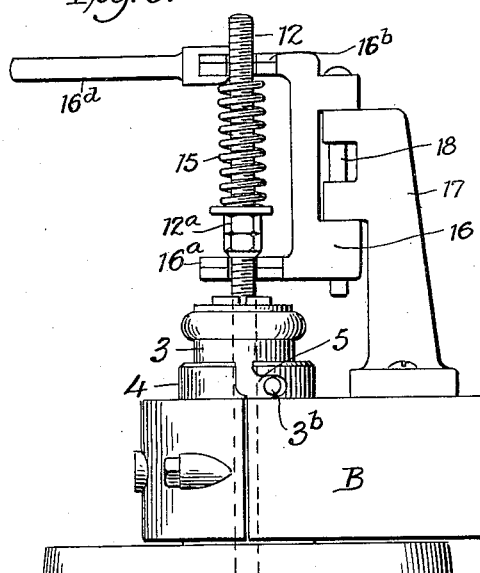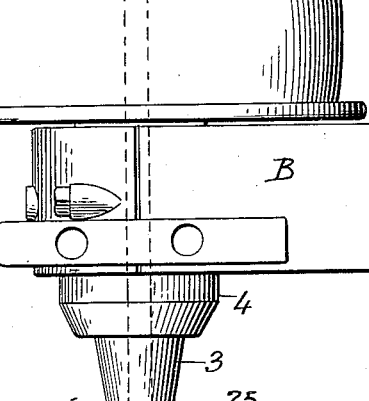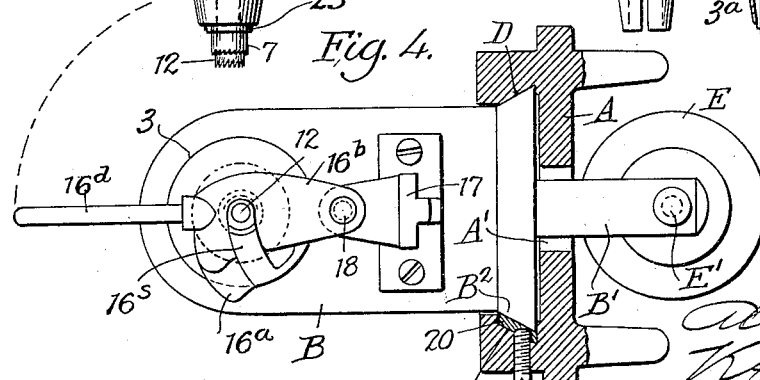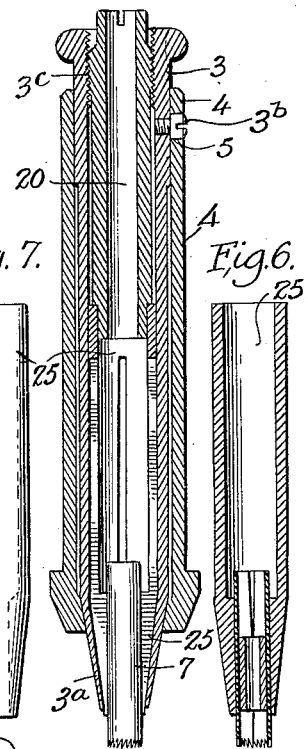

1,862,406

UNITED STATES PATENT OFFICE

ALBERT F. KEFFLO, OF MUSCATINE, IOWA, ASSIGNOR TO AUTOMATIC PEARL BUTTON CO., OF MUSCATINE, IOWA, A CORPORATION OF IOWA

BUTTON BLANK CUTTING MACHINE

Application filed May 29, 1930. Serial No. 457,024.

This invention is an improvement in machines for cutting pearl button blanks from shells and the like.

A primary object is to provide a machine of this kind which can be readily operated by unskilled labor and for this purpose it is necessary to provide means whereby rapid replacements of dulled saws and of worn out plugs may be made by the operator; and the invention provides a novel construction and combination of parts for the attainment of these ends.

The invention includes novel means for mounting the head stock so that it is capable of being automatically raised by pressure of the material being forced up against the cutting saw, whereby excessive or dangerous pressure on the work being operated upon will be prevented. Also novel means for removably mounting interchangeable saw holding chucks in the head stock. Also a novel tail stock or plug support tiltably mounted on the frame below the head stock, and means for tilting the tail stock into or out of operative position. Also novel means for adjusting and replacing the plugs or abutments. Other novel features of the invention will be hereinafter explained.

The accompanying drawings illustrate one practical embodiment of the invention and it will be explained with reference thereto, to enable others to understand and use the same; but the invention is not restrictd to the specific construction of parts illustrated in the drawings; and the claims summarize the essentials of the invention and the novel features of construction and novel combinations of parts for which protection is desired.

In the drawings;

Fig. 1 is a side elevation of a machine embodying my invention, the supporting column or frame being shown partly in section.

Fig. 2 is a front elevation of the machine.

Fig. 3 is an enlarged side elevation of the slidable head stock, and

Fig. 4 is a top view of the upper part of Fig. 3.

Fig. 5 is a sectional view of the driving spindle, inner chuck spindle, chuck and cutting saw.

Fig. 6 shows one type of solid chuck or spun, with a standard split saw keyed in place therein.

Fig. 7 shows a four-jaw chuck adapted to hold a straight tubular saw.

Fig. 8 is a bottom end view of the chuck shown in Fig. 7.

Fig. 9 is a view of one of the removable saw holding units detached.

The machine shown has a vertical supporting frame A, preferably a three sided cast iron box standard. To the front side of this frame are attached the head stock B and the tail stock C. The head stock B carries a spindle 4 on which is a driving pulley 4a and in which the removable saw holding unit 3 hereinafter described is removably secured.

The head stock B has a base B2 slidably fitted in vertical guides D on the standard A and can be accurately positioned in the guides by adjusting the gib 20 (see Fig. 4). The gravitational descent of the head stock is limited by an adjustable stop bolt G tapped through a lug on the frame A. The weight of the head stock may be increased and regulated by means of adjustable weights E strung on a rod E' hung on a stud B' attached to the head stock and projecting through a slot A' in the front wall of the frame A.

As shown in Fig. 5 in the main spindle 4 is removably inserted a saw-holding unit comprising a tubular spindle 3 a saw holding chuck 25 and a chuck-plug 20 (see Figs. 5 to 9). The spindle 3 is provided with a tapered lowered end 3a to engage the internally tapered lowered end of the main spindle 4, and spindle 3 is removably secured in the spindle 4 by means of a pin or screw 3b which engages a key slot 5 in the upper end of spindle 4. Into this spindle is inserted a four jaw split chuck 25 (Figs. 5 and 7) the lower end of which is tapered to engage the tapered end of the spindle which causes it to clamp the cutting saw 7 in the usual manner. Within the spindle 3 is inserted a plug 20 which is externally threaded at its upper end to engage internal threads 3c in the spindle 3, see Fig. 5, and the lower end of this plug engages the upper end of the split chuck 25 forcing the latter downward causing its tapered end to gradually grip the saw 7. As the spindle 4 revolves clockwise or from right to left the pin 3b engaging the inner end of the slot 5 causes the spindle 3 and the saw unit therein to rotate with the main spindle 4.

The shell or material is pressed upward against the saw during rotation thereof by a plug L in the tail stock C hereinafter referred to, and the pressure that can be applied to the material during the cutting operation is limited by the weight of the head stock B plus the weights E.

A set of such saw holding units, each containing a properly resharpened and reset cutting saw, is preferably provided for each machine and within easy reach of the operator; so that when a saw becomes dull the unit containing such dull saw can be quickly removed and replaced with a unit containing a sharp and properly set saw.

The tail stock C is tiltably mounted on the frame A below the head stock (see Figs. 1 and 2) and carries a plug L and means for adjusting the plug. The tail stock has a flanged base portion C' provided with an inwardly projecting lug C2 extending through a slot A2 in the frame A and provided with a circular opening which is engaged by an eccentric H, fast on a shaft S. Said shaft extends transversely of the frame A and is provided with a hand lever M whereby the shaft can be rocked to cause the eccentric to hold the tail stock rigidly in the position shown full line in Figs. 1 and 2, with the plug L in axial alinement with the saw 7 in the head stock, or when lever M is moved to the position shown in dotted lines in Fig. 1, the tail stock will be tilted outwardly as indicated in dotted lines in Fig. 1. When the lever M is in the position shown in full lines in Fig. 1 the eccentric is very nearly on center and locks the tail stock rigidly to the frame rod and in line with the spindle 4.

Within the tail stock is mounted a nonrotatable vertically movable plunger I, which is normally pressed downward in the tail stock by a spring P. Tapped into the lower end of the plunger I is a screw O, on the upper end of which the wooden plug L is seated.

The plug L is ordinarily composed of yielding material, such as wood, and is subjected to considerable pressure during the cutting operation when the material or shell being operated upon is forced by this plug upward against the cutting saw. The wear reduces the plug in length, and to compensate for this the threaded rod O can be turned by hand wheel Y to force the plug upwardly out of the plunger I the amount desired.

In order to press the work against the cutter 7, the plunger I with the plug and screw rod O can be moved upward in the tail stock by any suitable means. As shown the lower end of the plunger I is supported on the free bifurcated end of a lever K which is pivoted to the frame at Q and carries a roller R engaging a cam J on a shaft J' to which is attached the hand lever N.

When hand lever N is drawn toward the operator (who sits in front of the machine) cam J contacts with roller R and moves lever K upward. This raises plunger I and wooden plug L upward and the shell or material to be cut (which is inserted between the plug and saw) is forced against the saw 7. When the hand lever N is released the spring P forces plunger I and lever K down, until roller R comes to rest on the dwell of the cam J, thus lowering plug L and the material away from saw 7. The operator can then reposition the shell and repeat the operation.

When the plug wears and becomes too short for use it is necessary to replace it with a new one, and to enable this to be done quickly, and without disturbing any part of the machine (that is the entire head stock, including the cutting saw) the tail stock can be tilted outwardly as indicated in dotted lines in Fig. 1. This is readily accomplished by simply pulling hand lever M towards the front of the machine, as shown in dotted lines in Fig. 1, which causes eccentric A to unlock the tail stock and tilt it forwardly at an angle which permits the operator to readily remove the worn out plug, then back out rod O and place a new plug in plunger I. Then by moving lever M backwards the tail stock is returned to operative position and locked therein by the eccentric ready to resume cutting. All this can be done very quickly.

In my invention the entire body of the tail stock can be easily tilted outwardly towards the operator, enabling him to easily renew the plug; and the tail stock is not rigidly bolted to the frame of the machine as are others.

Mounted on the upper end of the head stock B is a bracket 17 which is hingedly connected by a pin 18 to a laterally swingable frame 16 having upper and lower arms 16a and 16b (see Figs. 3 and 4) which are provided with arcuate slots 16s for the accommodation of a presser rod 12; which rod extends axially through the saw holding unit and the saw, the lower end of the presser rod depending slightly below the saw when no work is present as indicated in Fig. 3.

The projection of the presser rod is regulatable by nuts 12a on the threaded upper end of the rod resting upon the arm 16a; and the rod is yieldingly depressed by an expansion spring 15 strung on the upper end of the rod between the nuts 12a and the arm 16b. The arm 16b may have a handle 16d by which the latch frame 16 can be moved. When the shell or material to be cut is placed on plug L and the latter is forced up toward the cutting saw, the material comes first in contact with presser-rod 12, thereby compressing spring 15, and the rod prevents the blank when cut free from the outside material from revolving, and also ejects the blank from the saw.

When a saw becomes dull and it is desirable to replace the unit containing such dull saw with a unit containing a sharp saw; the operator pulls latch frame 16 to one side, the slots in arms 16a—16b permitting this, and removes presser-rod 12. The unit 3 (Fig. 3) is then turned slightly to the left until pin 3b can be disengaged from slot 5, then the unit is lifted out laid aside, and another unit with a sharp cutting saw is inserted in spindle 4, and turned slghtly backward until pin 3b is locked in slot 5. Presser-rod 12 is then returned to place and latch lever 16 swung back into place, and the machine is then again ready for operation. The unit containing the dull saw can be taken to the tool room and resharpened. All units are interchangeable. A split chuck, Fig. 7, or solid chuck, Fig. 6, can be used in the spindle 3.

It will be seen that the entire pressure of the cutting of the material is borne by the plunger I and transmitted to the lever K. The barrel of the tail stock only acts as guide for plunger I and is not subjected to any stress whatever during the cutting operations.

The machine described is practical and operative, and makes possible the cutting of button blanks rapidly by unskilled labor, thus reducing the cost of cutting the blanks, which is the largest item of expense, in the production of pearl buttons from shells.

I claim:—

1. In a machine of the character specified; a support, a tail stock adapted to hold the work and pivotally attached to an eccentric rotatably mounted on said support, whereby the said tail stock will be pivoted into and rigidly held in operative position when the eccentric is rotated into one position, and the tail stock will be tilted to permit ready removal and replacement of the work when the eccentric is rotated into another position, and manually operable means for shifting said eccentric.

2. In a machine of the character specified; a support, a tail stock adapted to hold the work and having a shank provided with a circular opening, an eccentric rotatably mounted on said support and engaging said opening and pivotally connecting the stock to the support whereby the said tail stock will be pivoted into and rigidly held in operative position when the eccentric is rotated into one position, and the tail stock will be tilted to permit ready removal and replacement of the work when the eccentric is rotated into another position, and manually operable means for shifting said eccentric.

3. In a machine of the character specified; a support, a tail stock having a shank provided with a circular opening, a plug holding plunger mounted in said tail stock, a plug in said plunger, means for adjusting the plug in said plunger, a rock shaft having an eccentric engaging said opening whereby the said tail stock is pivotally attached to said support and may be rigidly held in operative position or tilted to permit ready removal and replacement of the plug, and manually operable means for rocking said shaft.

4. In a machine for cutting button blanks and the like; a frame, a tiltable tail stock thereon, a slidable plunger in said stock, an adjustable removable plug carried by said plunger, and manually operable means for moving the plunger in the tail stock and towards the saw; a head stock slidably mounted above the tail stock, and a rotatable saw carried by said head stock, the weight of the head stock limiting the pressure which can be applied to the work during the cutting operation by the movement of the plunger.

5. In a machine of the character specified; a frame, a vertically disposed gravitational head stock freely slidable thereon, means for limiting the descent of the head stock, a rotatable spindle mounted in the head stock, means for rotating the spindle, a removable interchangeable saw holding unit mounted in the said spindle, a tail stock tiltably connected to the frame below the head stock, means for locking the tail stock rigidly in axial alignment with the head stock, a plug carrying plunger slidably mounted in the tail stock, means for adjusting the plug in the plunger, and means for raising the plunger in the tail stock to cause the plug to press the work against the saw.

6. In mechanism as set forth in claim 5, the means for raising the plug holding plunger comprising a lever pivoted on the frame and supporting the plunger, a rock shaft carrying a cam engaging said lever, and manually operable means for rocking said shaft.

7. In a machine of the character specified; a head stock, a rotatable saw holding spindle mounted therein, a presser-rod extending through and projecting beyond the spindle, a swingable latch lever mounted at one end of the spindle and having slotted arms adapted to engage the projecting end of the presser-rod at spaced points, a limit stop on the presser-rod engaging one of the arms and a depressing spring on the presser-rod interposed between said stop and the other arm.

ALBERT F. KEFFLO.